United States Patent [19]

Stanislowski et al.

[11] Patent Number: 5,135,743
[45] Date of Patent: * Aug. 4, 1992

[54] COMBINED ODOR CONTROLLING ANIMAL LITTER

[75] Inventors: Anna G. Stanislowski, Walnut Creek; J. Bruce England, Pleasanton; Steven D. Ratcliff, Antioch, all of Calif.

[73] Assignee: The Clorox Company, Oakland, Calif.

[*] Notice: The portion of the term of this patent subsequent to May 28, 2008 has been disclaimed.

[21] Appl. No.: 705,278

[22] Filed: May 24, 1991

Related U.S. Application Data

[63] Continuation of Ser. No. 370,476, Jun. 23, 1989, Pat. No. 5,018,482, which is a continuation-in-part of Ser. No. 208,953, Jun. 17, 1988, Pat. No. 4,949,672.

[51] Int. Cl.$^5$ .............................................. A61L 11/00
[52] U.S. Cl. ..................................... 424/76.6; 119/171
[58] Field of Search ....................... 119/171, 172, 173; 424/76.6

[56] References Cited

U.S. PATENT DOCUMENTS

| | | | |
|---|---|---|---|
| 2,014,900 | 9/1935 | Lapp | 119/171 |
| 3,367,878 | 2/1968 | Mankowich | 252/110 |
| 3,864,472 | 2/1975 | Pensak et al. | 424/54 |
| 3,876,759 | 4/1975 | Pensak et al. | 424/58 |
| 3,915,880 | 10/1975 | Sepulveda | 252/99 |
| 3,947,570 | 3/1976 | Pensak et al. | 424/54 |
| 4,009,684 | 3/1977 | Kliment et al. | 119/172 |
| 4,369,199 | 1/1983 | Katzen | 426/641 |
| 4,421,664 | 12/1983 | Anderson | 252/94 |
| 4,469,046 | 9/1984 | Yananton | 119/1 |
| 4,494,481 | 1/1985 | Rodriquez | 119/1 |
| 4,494,482 | 1/1986 | Arnold | 119/1 |
| 4,619,862 | 10/1986 | Sokolowski | 428/221 |
| 4,621,011 | 11/1986 | Fleischer | 428/221 |
| 4,640,225 | 2/1987 | Yananton | 119/1 |
| 4,650,479 | 3/1987 | Insley | 604/358 |
| 4,711,739 | 12/1987 | Kandathil | 252/139 |
| 4,774,907 | 10/1988 | Yananton | 119/1 |
| 4,806,263 | 2/1989 | Leathers et al. | 252/106 |
| 4,867,898 | 9/1989 | Spaulding | 252/106 |
| 4,949,672 | 8/1990 | Ratcliff | 119/1 |
| 4,957,063 | 9/1990 | Heitfeld | 119/1 |
| 5,018,482 | 5/1991 | Stanislowski et al. | 119/172 X |

FOREIGN PATENT DOCUMENTS

| | | |
|---|---|---|
| 841699 | 9/1976 | Belgium . |
| 407064 | 1/1991 | European Pat. Off. . |
| 410576 | 1/1991 | European Pat. Off. . |
| 2531496 | 2/1977 | Fed. Rep. of Germany ..... 424/76.6 |
| 2310135 | 1/1977 | France ..................................... 424/76.6 |
| 9011096 | 10/1990 | PCT Int'l Appl. .................. 424/76.6 |
| 1533261 | 11/1978 | United Kingdom . |

OTHER PUBLICATIONS

European Search Report from EP 90.306773.
European Search Report from EP 90.306772 (published as EP 410576) (equivalent of U.S. Ser. No. 07/570,986 (Aug. 22, 1990)).

Primary Examiner—Robert P. Swiatek
Attorney, Agent, or Firm—Joel J. Hayashida; Michael J. Mazza; Harry A. Pacini

[57] ABSTRACT

The invention provides a liquid composition for deodorizing animal wastes by direct application thereto. The composition comprises an aqueous dispersion which contains an ammonia-controlling-effective amount of pine oil and boric acid.

6 Claims, No Drawings

COMBINED ODOR CONTROLLING ANIMAL LITTER

RELATED APPLICATION

This is a continuation of U.S. patent application Ser. No. 07/370,476, filed Jun. 23, 1989, now U.S. Pat. No. 5,018,482, itself a continuation-in-part of U.S. patent application Ser. No. 07/208,953, of Steven D. Ratcliff et al., filed Jun. 17, 1988, now U.S. Pat. No. 4,949,672 the disclosure of which is wholly incorporated herein by reference thereto.

BACKGROUND OF THE INVENTION

1. Field of the Invention

This invention relates to an animal litter at least a portion of which has been contacted with an antimicrobially-effective amount of pine oil combined with an effective amount of boric acid, or a boron-containing material having an equivalent boron level.

2. Brief Description of Related Art

Because of the growing number of domestic animals used as house pets, there is a need for litters so that animals may micturate, void or otherwise eliminate liquid or solid waste indoors in a controlled location. However, inevitably, waste build-up leads to malodor production.

Pine oil has been suggested in the prior art as a fragrance only, for application to a litter. For example, Frazier, U.S. Pat. No. 4,085,704, discloses the impregnation of an inorganic carrier vehicle, such as silica gel or mullite. Also, Colborn, et al., U.S. Pat. No. 4,407,231 (of common assignment) discloses the microencapsulation of fragrances, including pine oil, via a polymeric slurry, which is then sprayed onto a portion of litter particles, and dried.

Miller et al., U.S. Pat. No. 3,675,625, disclose a litter which is "activated" by heating and then contacted with an odor control agent, such as pine oil, citrus oil, camphor or the like.

Still further, it has been suggested that a borax/boric acid mixture at a pH of 4-4.5 could be added to a cellulose litter containing a pheromone. (Christianson, U.S. Pat. No. 4,263,873). Yet further, in Ratcliff et al., commonly assigned U.S. patent application Ser. No. 07/208,953, filed Jun. 17, 1988, an odor control animal litter has been disclosed and has claimed a clay-based, particulate substrate to which has been applied a liquid carrier containing a boron-containing material at a critical level of at least 0.06% equivalent boron.

However, the art does not disclose, teach, suggest or recognize the combination of pine oil and boric acid as a dual odor controlling system when applied to animal litters. Finally, the art has not taught, disclosed or suggested that either or both of these odor controlling materials can be used in conjunction with aluminum salts for effective ammonia control.

SUMMARY OF THE INVENTION

The invention provides an odor controlling animal litter comprising
(a) adsorbent or absorbent particles; and
(b) an ammonia-controlling-effective odor controlling combination of i) an effective amount of pine oil and ii) an effective amount of boric acid, or its equivalent, preferably carried onto said particles via a liquid dispersion.

The invention also comprises a method of delivering an ammonia-controlling-effective amount of an odor controlling agent to an animal litter which method comprises contacting the litter, with an aqueous dispersion of a mixture of an ammonia-controlling-effective amount of pine oil and boric acid or its equivalent.

It is therefore an objective of this invention to provide an odor controlling animal litter.

It is a further objective of this invention to provide a low cost, highly effective odor controlling material for animal litter.

It is a still further object of this invention to effectively disperse consistently the odor controlling agents, pine oil combined with boric acid (or its equivalent), onto the litter particles so as to maximize the odor controlling benefit.

It is still another object of this invention to combine pine oil and boric acid (or its equivalent) as an odor controlling system, preferably by using a liquid carrier for simultaneous delivery, on an animal litter.

DETAILED DESCRIPTION OF THE PREFERRED EMBODIMENTS

The present invention provides an odor controlling animal litter for use by domestic animals. It is well understood that soiled animal litters become malodorous due to the decomposition of nitrogenous products present in animal waste. The breakdown of these nitrogenous products into ammonia is believed to be mediated by enzymes produced by many bacteria and other microflora. As an example, urease acts as a catalyst to break down urea into ammonia via the following chemical pathway.

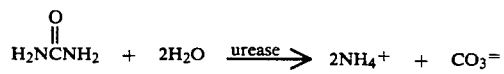

Thus, odor formation can be controlled or mitigated through the use of materials which are toxic to bacteria and other microflora which produce enzymes which decompose nitrogenous products.

It has been surprisingly discovered that pine oil can, in combination with boric acid, or its boron equivalent, in antimicrobially-effective amounts, control odor formation by controlling microbial decomposition of nitrogenous products, not merely by masking malodors.

1. Pine-Oil Odor Controlling Agent:

Pine oil is a complex blend of oils, alcohols, acids, esters, aldehydes and other organic compounds. These include terpenes, which include a large number of related alcohols or ketones. Some important constituents include terpineol, which is one of three isomeric alcohols having the basic molecular formula $C_{10}H_{17}OH$. Other important compounds includes alpha- and beta-pinene (turpentine), abietic acid (rosin), and other isoprene derivatives. Further, the apparent fragrance or strength of such fragrance, in a particular pine oil is not necessarily correlatable to the particular pine oil's germicidal activity.

Particularly effective pine oils appear to be Unipine 60 (Union Camp, which is believed to contain 61% terpene alcohols, 37% terpene hydrocarbons, remainder: moisture and miscellaneous) and Unipine 90 (Union Camp, about 95% terpene alcohols, 4% terpene hydrocarbons, remainder: moisture and miscellaneous). Other concentrated products, which can contain up to 97% pure alpha-terpineol, have been used with success. In the present invention, the levels of pine oil as low as 0.1% (47% active) have been found to be effective odor control agents. Additionally, the range of pine oil that should be a ammonia-controlling-effective amount vary from about 0.001 to 50% by weight of the composition, more preferably 0.05-25%, and most preferably 0.1-10%, by weight of the composition.

As discussed in the background of the invention, above, at least three references have discussed the use of pine oil as a fragrance additive. However, two of the references (Frazier, U.S. Pat. No. 4,085,704; Colborn et al., U.S. Pat. No. 4,407,231) either impregnate pine oil in an inorganic, porous carrier vehicle, or completely encapsulate with an organic coating, so as to provide, respectively, a slow-release product, or one which does not release at all except by fracturing of the microcapsule. The third (Miller et al., U.S. Pat. No. 3,675,625), on the other hand, teaches that the pine oil must be added to litter under apparently anhydrous conditions to avoid the presence of water. None, however, teaches that pine oil combined with boric acid (or its equivalent) provide surprisingly effective ammonia control which is superior to that of pine oil alone (although pine oil alone can be an effective ammonia-controlling agent). Applicants, on the other hand, have surprisingly found that pine oil plus boric acid (or its equivalent) act as an odor controlling system for animal litters by preventing ammonia formation, rather than merely by masking odors.

In the invention, it is preferred to deliver the pine oil and boric acid (or its equivalent) in a liquid vehicle onto at least a portion of the litter. This has the advantages of dispersing uniform amounts of the actives together and to control the amount of actives such that there is the maximum available for use. (However, it may also be possible to add the two components separately, depending on manufacturing conditions.) Because a relatively small amount of pine oil is being applied to the litter, uneven application could result unless a diluting medium were used. Water is very advantageous for use here because: it is an inexpensive medium and avoids the potential hazards of solvents. Additionally, it has the benefit of solubilizing the other component, boric acid.

Accordingly, a key aspect of the invention is to contact the litter particles with an aqueous dispersion of water, the pine oil, the boric acid and a dispersion aid which uniformly disperses the materials in the water. The preferred dispersion aids are surfactants, although solvents and hydrotropes may be appropriate (but not as prefered). The surfactants are selected from anionic, nonionic, cationic, amphoteric surfactants, and mixtures thereof. Suitable surfactants may be found in *Kirk-Othmer, Encyclopedia of Chemical Technology*, 3rd Edition, Vol. 22, pages 346-387 (1983), and *McCutcheons's Detergents and Emulsifiers*. North American Edition, 1983, both of which are incorporated herein by reference.

Especially suitable surfactants are nonionic surfactants. Those which have an HLB of about 9-14, more preferably about 10-13, are favored. These include ethoxylated and propoxylated fatty alcohols, and ethoxylated and propoxylated alkyl phenols, having both with alkyl chains of about 7-16, more preferably about 8-13 carbons in length. A preferred ethoxylated alcohol is Neodol 91-8, a $C_{9-11}$ fatty alcohol with about 8 moles of ethylene oxide per mole of alcohol, from Shell Chemical Company. A preferred ethoxylated alkyl phenol is Triton X-102, an ethoxylated octylphenol with about 10-12 moles of ethylene oxide per mole of alcohol. A mixture of Neodol 91-8 and Triton X-102 is also preferred.

The surfactants can be selected and amounts used to give best results in dispersing the pine oil, giving good stability and obtaining lack of phase separation. It is preferred to use the surfactants in about 0.001 to 1% by weight of the treated litter, more preferably about 0.005 to 0.5% by weight of the treated litter. In the aqueous dispersion, the surfactant will comprise about 0.05 to 10%, more preferably 0.1 to 5% by weight of the dispersion. Concurrently, in the dispersion, the pine oil constituent will comprise about 0.03 to 50%, more preferably 2 to 25%, most preferably 4 to 15%, by weight of the dispersion. Further, the surfactant will be in proportion to the pine oil at a ratio of about 0.01 to 1, more preferably 0.1 to 1 of total surfactant to pine oil.

2. Boron-Based Odor Control Additive:

The other component of the invention is boric acid, or an equivalent boron compound providing the same amount of equivalent boron level. *See, Kirk Othmer, Encyclopedia Chemical Technology*. 3rd Ed., Vol. 4, pp. 71-77 (1978), incorporated herein by reference. Although Applicants refer, from time to time herein, to commonly assigned U.S. patent application Ser. No. 07/208,953, filed Jun. 17, 1988, said application is also incorporated by reference thereto as if fully set forth herein.

Boric acid has the structure $H_3BO3$. Boric acid appears to provide multiple benefits in odor control by: (1) acting as a urease inhibitor, which controls odors by preventing enzymatic breakdown of urea; (2) apparently having bacteriostatic properties, which appear to help control odor by controlling the growth of bacteria which are responsible for production of the urease enzymes; and (3) possibly, lowering the pH of the litter thereby neutralizing basic material such as ammonia and amines of animal waste products.

Borax ($Na_2B_4O_7 \times 10H_2O$) is another suitable compound for use in the invention. Other boron-based compounds potentially suitable for use are disclosed in *Kirk-Othmer. supra*. pp.67-109, said pages being incorporated herein by reference. In fact, as further discussed below, it appears that the active boron material in the preferred embodiment of this invention is actually a mixture of polyborate species, which is formed in situ in a liquid carrier; or it could be separately manufactured, dried, and used. Combinations of boric acid and borax, or other boron-based compounds, are also included in the invention.

An odor controlling effective amount is defined as at least about 0.06% equivalent boron, more preferably at least greater than 0.06%. The preferred range varies from about 0.06 to about 50%, by weight of the composition. It is more specially preferred that 0.1 to 25%, and most preferably, about 0.1 to 10%, by weight of the composition be used. Assuming the critical level is attained, those skilled in the art will adjust the compositional levels to ensure effective odor control and cost effectiveness.

In the following discussion, equivalent boron is defined as the amount of atomic boron delivered in wt. %. Equivalent boron is determined by calculating the amount of atomic boron in a boron-containing compound, and comparing it to another boron containing compound. E.g., assuming 1 g boric acid and 1 g borax, equivalent boron is:

$$1\text{g boric acid}^* \left( \frac{10.81 \text{ g B}^{**}}{61.84 \text{ g boric acid}} \right) = 0.1748 \text{ g equiv. boron}$$

$$1\text{g borax}^{*} \left( \frac{43.24 \text{ g B}^{}}{381.37 \text{ g borax}} \right) = 0.1134 \text{ g equiv. boron}$$

Comparing the equivalents in borax and boric acid: $\frac{0.1134}{0.1748} \times 100\% = 64.87\%$

*Molecular weight of boric acid ($H_3BO_3$) is 61.84.
**Atomic weight of boron is 10.81. In boric acid, there is only one atom of boron; in borax, there are four.
***Molecular weight of borax ($Na_2B_4O_7 \times 10H_2O$) is 381.37.

Thus, borax has 64.87% of the amount of equivalent boron compared to 1 g boric acid.

The boron-containing materials are powdered or comminuted solids, and are combined with a liquid carrier as disclosed in co-pending U.S. patent application Ser. No. 07/208,953, and demonstrated below, in the EXPERIMENTAL section. The carrier is water or water and a solvent, emulsifier or a hydrotrope, as necessary. It is essential to add the additive via liquid carrier to evenly distribute the additive to the litter material.

3. Litter Materials:

A wide variety of materials can be used for litters. For example, porous clays are readily adaptable for use as the absorbent substrates needed for litters. Suitable litters include aluminosilicates, such as attapulgite, bentonite, montmorillonite; fossilized plant materials; expanded perlites; zeolites; gypsum and other equivalent materials known to those skilled in the art. Sawdust, wood chips, paper or other cellulose based materials can be utilized. For instance, compacted paper, or processed, recycled pulp can be suitable for use, such as disclosed in Sokolowski et al., U.S. Pat. No. 4,619,862, and Fleischer et al., U.S. Pat. No. 4,621,011, both of which are incorporated herein by reference. Other litter materials can be used, such as fruit and vegetable wastes, e.g., Fry et al., U.S. Pat. No. 3,923,005. The litter particles have an average particle diameter of 50–5,600 microns, preferably about 100–500 microns. It is beneficial to obtain uniform sizing (such as by screening or sieving) and to have low amounts of fines, which will generate dust. Those skilled in the art will vary particle size so as to optimize absorbency/adsorbency, and to control dusting or tracking by the animal.

4. Adjunct Materials:

Aluminum salts can be used to obtain an additional benefit, amongst the most important adjunct materials. A favored aluminum salt is hydrated aluminum oxide ($Al_2O_3$). A typical salt is a trihydrated aluminum salt-/sodium chloride mixture. Although prior art has disclosed that aluminum salts have been used in animal bedding, see, e.g., Sawyer et al., U.S. Pat. No. 3,029,783, and Sawyer et al., U.S. Pat. No. 2,895,873, there is previously no recognition, teaching or suggestion that these aluminum salts could be combined with pine oil and/or boric acid to provide an odor control benefit. Also, certain polymers can be added which are so-called "superabsorbent" polymers to efficiently wick liquid wastes and entrap them, further bolstering odor control. Further adjunct materials that are suitable for use include dyes and pigments, such as suitably treated titanium dioxide. Additional and different germicides such as quaternary ammonium compounds, and certain 3-isothiazolones (sold under the trademark KA-THON ®, Rohm and Haas), and chemical deodorants, such as sodium bicarbonate, can be utilized. Other odor controlling agents such as heavy metals (see, e.g., Rodriguez et al., U.S. Pat. No. 4,494,481), enzyme inhibitors (see Heitfeld et al., U.S. patent application Ser. No. 07/223,502, filed Jul. 25, 1988, of common assignment hereof, and incorporated by reference herein), and reducing agents, such as sodium thiosulfate or sodium bisulfite (see, e.g., Anderson et al., U.S. Pat. No. 4,421,664). Also, in conjunction with the litter, superabsorbent polymers, whether, used as box liners, cut into discrete pieces, or formed into particles, can be utilized, such as suggested in Arnold, U.S. Pat. No. 4,494,482, Insley, U.S. Pat. No. 4,650,479, and Yanaton, U.S. Pat. Nos. 4,469,046 and 4,640,225. Further, fragrances, which are used to mask odors can be used. The fragrances can be uncoated (e.g., fragrance blends) or encapsulated (as in Colborn et al., U.S. Pat. No. 4,407,231). Further adjuncts include dedusting compounds or agents, such as water-soluble polymeric resins, e.g., polyvinyl alcohol, polyvinyl pyrrolidone, polyacrylic acid, xanthan gum, gum arabic, other natural resins, and mixtures of any of these resins.

In the EXPERIMENTAL section which follows, Applicants further demonstrate the surprising and dramatic results which are obtained when pine oil is added as an odor controlling agent to animal litters.

EXPERIMENTAL

In the following examples, stable formulations to be applied to the litters were formulated:

EXAMPLE 1

| Ingredient | Formula % | Product Delivery %[1] |
|---|---|---|
| Water | 76.4 | 2.29 |
| Boric Acid | 15.0 | 0.45 |
| NaOH | 2.7 | 0.08 |
| Surfactant 1[2] | 0.3 | 0.01 |
| Surfactant 2[3] | 0.6 | 0.02 |
| Pine Oil[4] | 5.0 | 0.15 |
| | 100.0 | 3.00 |

[1] 12 g of liquid formula are sprayed onto 400 g of Georgia clay litter (Oil-Dri Corporation), resulting in the percentages of product (formula) delivered onto the clay particles.
[2] $C_8$ alkyl ethoxylated phenol nonionic surfactant (12–13 moles of ethylene oxide per mole of phenol).
[3] $C_{9-11}$ ethoxylated alcohol (8 moles of ethylene oxide per mole of alcohol).
[4] Pine Oil, 47% active.

EXAMPLE 2

| Ingredient | Formula % | Product Delivery % |
|---|---|---|
| Water | 74.4 | 2.23 |
| Boric Acid | 15.0 | 0.45 |
| NaOH | 2.7 | 0.08 |
| Surfactant 1 | 0.4 | 0.01 |
| Surfactant 2 | 0.8 | 0.02 |
| Pine Oil | 6.7 | 0.20 |
| | 100.0 | 2.99 |

EXAMPLE 3

| Ingredient | Formula % | Product Delivery % |
|---|---|---|
| Water | 80.3 | 2.41 |
| Boric Acid | 10.0 | 0.30 |
| NaOH | 1.8 | 0.06 |
| Surfactant 1 | 0.4 | 0.01 |

-continued

| Ingredient | Formula % | Product Delivery % |
|---|---|---|
| Surfactant 2 | 0.8 | 0.02 |
| Pine Oil | 6.7 | 0.20 |
| | 100.0 | 3.00 |

EXAMPLE 4

| Ingredient | Formula % | Product Delivery % |
|---|---|---|
| Water | 72.4 | 2.17 |
| Boric Acid | 16.7 | 0.50 |
| NaOH | 3.0 | 0.09 |
| Surfactant 1 | 0.4 | 0.01 |
| Surfactant 2 | 0.8 | 0.02 |
| Pine Oil | 6.7 | 0.20 |
| | 100.0 | 2.99 |

FORMULATION PROCEDURE

To formulate stable dispersions for application to the litters as in the Examples 1–41, the boric acid and NaOH are added to the water, stirring to dissolve (approximately 10 minutes). Then, the surfactants are added to the solution, until evenly into solution (5–10 minutes). Finally, the pine oil is added until a milky appearance ("bloom") fully develops (5–7 minutes).

This dispersion is then sprayed onto a moving bed of litter particles, although there are other techniques of delivering the dispersion, e.gs., fluid bed, drum coating, spray tower, vibrating bed, and other ways known to those skilled in the art. At least 20%, most preferably 30%, of the litter particles are substantially fully coated.

In TABLE I below, Examples 1–4 were compared against an untreated litter for performance benefits. As can be seen from the data, effective odor control was attained by diverse combinations of pine oil and boric acid.

TABLE I

| | Performance Data Formulation | | Ammonia |
|---|---|---|---|
| Example | Pine Oil, % | Boric Acid, % | generated, ppm |
| Control | — | — | 1,050 |
| 1 | 0.15 | 0.45 | 30 |
| 2 | 0.20 | 0.30 | 60 |
| 3 | 0.20 | 0.45 | 24 |
| 4 | 0.20 | 0.50 | 6 |

In TABLES II and III below, further examples of the litter with the inventive combined odor controlling system were demonstrated. The effectiveness of the combined system was dramatically superior.

TABLE II

Summary of Formulas and Stabilities

| Ingredient & Formula Wt. % | Example | | | | | | | | | | | |
|---|---|---|---|---|---|---|---|---|---|---|---|---|
| | 6 | 7 | 8 | 9 | 10 | 11 | 12 | 13 | 14 | 15 | 16 | 17 |
| Water | 90.6 | 90.6 | 91.4 | 89.6 | 89.6 | 90.4 | 94.7 | 86.6 | 85.8 | 87.1 | 82.7 | 80.4 |
| Dispersant | | | | | | | | | | | | |
| Nonionic Surfactant 1[1] | 1.0 | | | 1.0 | | | | | | | | |
| Nonionic Surfactant 2[2] | | 1.0 | | | 1.0 | | | | | | | 1.8 |
| Cationic Surfactant[3] | | | 0.2 | | | 0.2 | 0.2 | 0.2 | 0.2 | 0.2 | 0.2 | |
| Sodium Hydroxide | 0.6 | 0.6 | 0.6 | 1.1 | 1.1 | 1.1 | 0.4 | 1.7 | 1.5 | 1.1 | 1.1 | 1.8 |
| Boric Acid | 3.3 | 3.3 | 3.3 | 5.8 | 5.8 | 5.8 | 2.2 | 9.0 | 8.0 | 5.6 | 6.0 | 10.0 |
| Pine Oil[4] | 4.5 | 4.5 | 4.5 | 2.5 | 2.5 | 2.5 | 2.5 | 2.5 | 4.5 | 6.0 | 10.0 | 6.0 |
| Stability (Maximum time) | 30 min. | 30 min. | unstable | 30 min. | 30 min. | 30 min. | unstable | unstable | unstable | unstable | unstable | 30 min. |

| Ingredient & Formula Wt. % | Example | | | | | | | | | | | |
|---|---|---|---|---|---|---|---|---|---|---|---|---|
| | 18 | 19 | 20 | 21 | 22 | 23 | 24 | 25 | 26 | 27 | 28 | 29 |
| Water | 80.4 | 80.7 | 81.0 | 79.9 | 79.9 | 79.9 | 76.4 | 74.4 | 80.3 | 78.3 | 76.4 | 74.4 |
| Dispersant | | | | | | | | | | | | |
| Nonionic Surfactant 1[1] | 1.2 | 1.0 | 0.8 | | 2.0 | 1.2 | 0.6 | 0.6 | 0.8 | 0.8 | 0.8 | 0.8 |
| Nonionic Surfactant 2[2] | 0.6 | 0.5 | 0.4 | 3.0 | 1.0 | 0.6 | 0.3 | 0.3 | 0.4 | 0.4 | 0.4 | 0.4 |
| Cationic Surfactant[3] | | | | | | | | | | | | |
| Sodium Hydroxide | 1.8 | 1.8 | 1.8 | 1.1 | 1.1 | 1.2 | 2.7 | 3.0 | 1.8 | 2.1 | 2.4 | 2.7 |
| Boric Acid | 10.0 | 10.0 | 10.0 | 6.0 | 6.0 | 6.7 | 15.0 | 16.7 | 10.0 | 11.7 | 13.3 | 15.0 |
| Pine Oil[4] | 6.0 | 6.0 | 6.0 | 10.0 | 10.0 | 10.0 | 5.0 | 5.0 | 6.7 | 6.7 | 6.7 | 6.7 |
| Stability (Maximum time) | 30 min. | 15 min. | 15 min. | 30 min. | 15 min. | 15 min. | 15 min. | 15 min. | 15 min. | 15 min. | 15 min. | 15 min. |

| Ingredient & Formula Wt. % | Example | | | | | | | | | | | |
|---|---|---|---|---|---|---|---|---|---|---|---|---|
| | 30 | 31 | 32 | 33 | 34 | 35 | 36 | 37 | 38 | 39 | 40 | 41 |
| Water | 72.4 | 70.1 | 68.6 | 76.4 | 74.5 | 72.5 | 70.5 | 76.5 | 74.4 | 72.5 | 70.5 | 68.5 |
| Dispersant | | | | | | | | | | | | |
| Nonionic Surfactant 1[1] | 0.8 | 0.8 | 0.9 | 1.0 | 1.0 | 1.0 | 1.0 | 1.2 | 1.2 | 1.2 | 1.2 | 1.2 |
| Nonionic Surfactant 2[2] | 0.4 | 0.4 | 0.4 | 0.5 | 0.5 | 0.5 | 0.5 | 0.6 | 0.6 | 0.6 | 0.6 | 0.6 |
| Cationic Surfactant[3] | | | | | | | | | | | | |
| Sodium Hydroxide | 3.0 | 3.5 | 3.5 | 2.1 | 2.4 | 2.7 | 3.0 | 1.8 | 2.1 | 2.4 | 2.7 | 3.0 |
| Boric Acid | 16.7 | 18.5 | 18.5 | 11.7 | 13.3 | 15.0 | 16.7 | 10.0 | 11.7 | 13.3 | 15.0 | 16.7 |
| Pine Oil[4] | 6.7 | 6.7 | 8.0 | 8.3 | 8.3 | 8.3 | 8.3 | 10.0 | 10.0 | 10.0 | 10.0 | 10.0 |
| Stability (Maximum time) | 15 min. | 10 min. | 10 min. | 15 min. | 15 min. | 15 min. | 15 min. | 15 min. | 15 min. | 15 min. | unstable | unstable |

[1] Neodol 91-8, a $C_{9-11}$ fatty alcohol ethoxylate with 8 moles ethylene oxide, from Shell Chemical Co.
[2] Triton X-102, an octylphenol ethoxylate, with 12-13 moles of ethylene oxide, from Rohm & Haas Co.
[3] A dimethyl, difatty alkyl quaternary ammonium chloride from Sherex Chemical Co.
[4] A pine oil with 61% terpene alcohols, 37% terpene hydrocarbons, from Union Camp.

In TABLE III, Examples 6–41 were compared against untreated litters for performance benefits. In the data, each example was compared against a control, an untreated clay. Performance was measured as $NH_3$ generated by a sample as a percentage of that generated by the control. As can be seen from the data, effective odor control was attained by diverse combinations of pine oil and boric acid.

TABLE III

Performance Results

| Example | 6 | 7 | 8 | 9 | 10 | 11 | 12 | 13 | 14 | 15 | 16 | 17 |
|---|---|---|---|---|---|---|---|---|---|---|---|---|
| % Additives Delivered [1, 2, 3] | .3P, .2B | .3P, .2B | .3P, .2B | .15P, .35B | .15P, .35B | .15P, .35B | .15P, .14B | .15P, .56B | .3P, .5B | .36P, 35B | .3P, .2B | .2P, .3B |
| ppm $NH_3$ as a % of Control [4] | 0.8 | 1.4 | 1.4 | 1.4 | 0.8 | 2.3 | 0.0 | 0.0 | 0.0 | 0.0 | 0.0 | 0.0 |

| Example | 18 | 19 | 20 | 21 | 22 | 23 | 24 | 25 | 26 | 27 | 28 | 29 |
|---|---|---|---|---|---|---|---|---|---|---|---|---|
| % Additives Delivered [1, 2, 3] | .2P, .3B | .2P, .3B | .2P, .3B | .3P, .2B | .3P, .2B | .3P, .2B | .15P, .45B | .15P, .5B | .2P, .3B | .2P, .35B | .2P, .4B | .2P, .45B |
| ppm $NH_3$ as a % of Control [4] | 0.0 | 0.0 | 0.0 | 0.0 | 0.0 | 0.0 | 1.3 | — | 1.3 | 0.0 | — | 1.3 |

| Example | 30 | 31 | 32 | 33 | 34 | 35 | 36 | 37 | 38 | 39 | 40 | 41 |
|---|---|---|---|---|---|---|---|---|---|---|---|---|
| % Additives Delivered [1, 2, 3] | .2P, .5B | .2P, .5B | .24P, .55B | .25P, .35B | .25P, .4B | .25P, .45B | .25P, .5B | .3P, .3B | .3P, .35P | .3P .4B | .3P, .45B | .2P, .5B |
| ppm $NH_3$ as a % of Control [4] | 1.3 | — | — | — | — | — | — | — | — | 0.0 | — | — |

[1] Calculated by 30 g. of formula applied to 400 g. of clay litter.
[2] P = % pine oil.
[3] B = % boric acid.
[4] Calculated by running 3 replicates of each 50 g. example, and an untreated 50 g. clay litter sample as a control. Each sample and control was dosed with 50 ml. urine.

The invention is not limited herein to the specific examples demonstrated and includes those equivalents which would be known to those skilled in the art. The invention is further embodied in the claims which follow.

We claim:

1. A liquid composition for deodorizing animal wastes by direct contact therewith, said composition comprising:
   an ammonia-controlling-effective combination of 0.003–50% pine oil and 0.06–50% boric acid carried in a liquid dispersion.

2. The liquid composition of claim 1 wherein said liquid dispersion is selected from the group consisting of water, solvent, or water combined with a surfactant, hydrotrope or solvent dispersion aid.

3. The liquid composition of claim 2 wherein said dispersion in aqueous and said dispersion aid is selected from the group consisting of anionic, nonionic, cationic, amphoteric surfactants, and mixtures thereof.

4. The liquid composition of claim 3 wherein said surfactant is at least one nonionic surfactant.

5. The liquid composition of claim 4 wherein said surfactant further comprises a mixture of an ethoxylated fatty alcohol and an ethoxylated alkyl phenol.

6. A method of delivering an ammonia-controlling effective amount of odor controlling agent to an animal waste comprising:
   applying directly to said waste an aqueous dispersion which comprises a mixture of an ammonia-controlling-effective amount of pine oil and boric acid.

* * * * *